Patented Apr. 5, 1927.

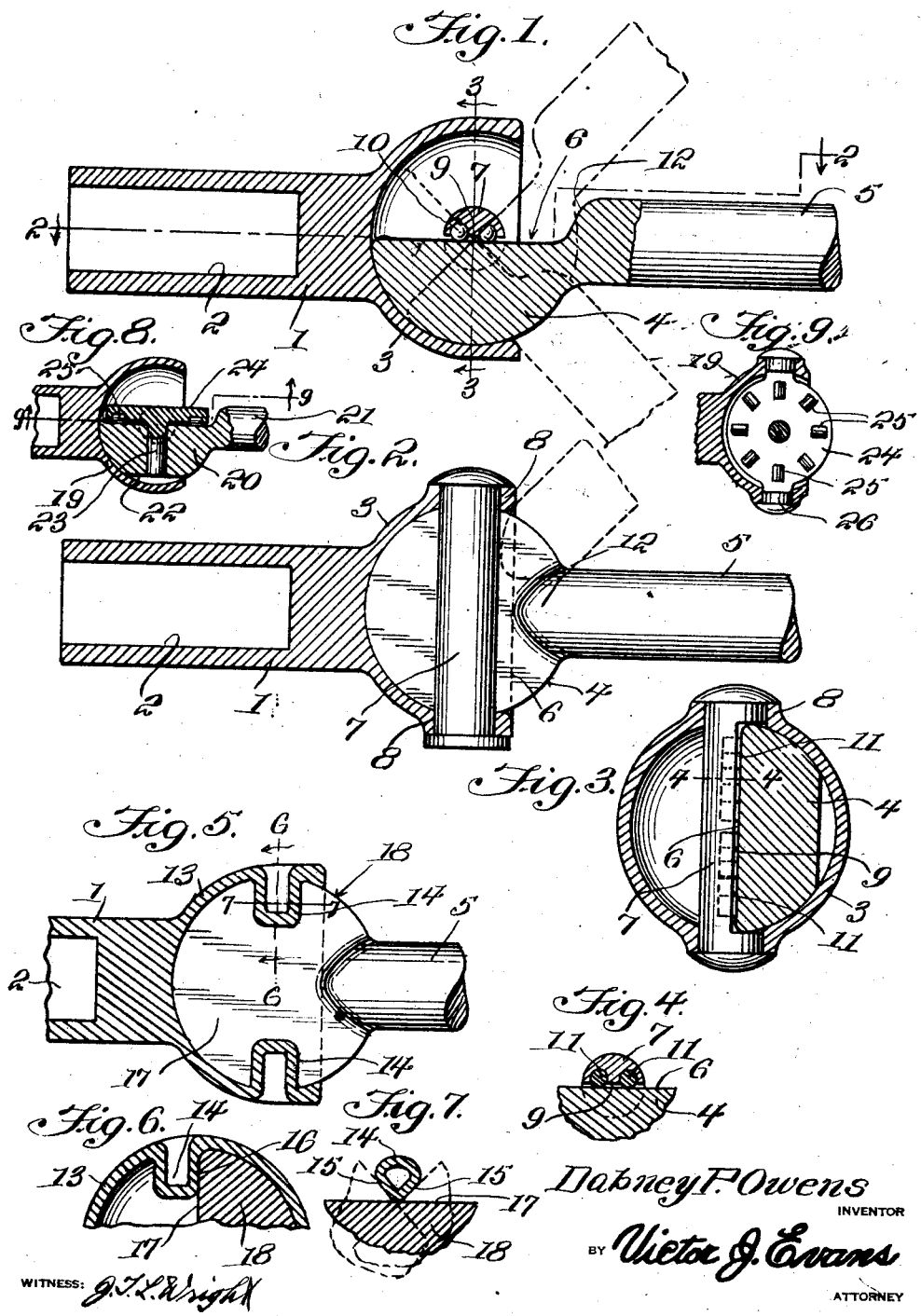

1,623,199

UNITED STATES PATENT OFFICE.

DABNEY P. OWENS, OF LAKE WORTH, FLORIDA.

UNIVERSAL JOINT.

Application filed July 10, 1925. Serial No. 42,735.

My present invention has reference to a universal ball and socket gear or connection between a drive and a driven shaft, and has for its objects the provision of means for affording a wide range of angular relation between the driven and drive jacks, in which the friction between parts is reduced and in which the construction is such as to materially reduce the cost of manufacture and the selling price of the gear or connection.

With the above broadly stated objects in view and others which will present themselves as the nature of the invention is better understood, the improvement resides in the construction, combination and operative association of parts, a satisfactory embodiment of which is illustrated by the accompanying drawings.

In the drawings:—

Figure 1 is a substantially central longitudinal sectional view through the improvement.

Figure 2 is a sectional view approximately on the line 2—2 of Figure 1.

Figure 3 is a transverse sectional view approximately on the line 3—3 of Figure 1, but illustrating a slight modification.

Figure 4 is a detail sectional view approxmately on the line 4—4 of Figure 3.

Figure 5 is a view substantially similar to Figure 2, illustrating a further modification.

Figure 6 is a sectional view approximately on the line 6—6 of Figure 5.

Figure 7 is a sectional view on the line 7—7 of Figure 5.

Figure 8 is a sectional view of a still further modification.

Figure 9 is a sectional view on the line 9—9 of Figure 8.

My improvement includes a shank 1 having a socket 2 to receive therein the end of a drive shaft, (not shown). The shank has formed on one of its ends a ball socket 3. The ball socket is designed to have received therein a semi-spherical head 4 formed on one end of a rod 5 that is connected to the driven shaft and may in reality provide the driven shaft. The rounded surface of the head 4 is designed for contacting engagement with the rounded inner wall of the socket 3, and by reference to Figure 1 of the drawings it will be noted that the rod 5 has one of its edges rounded inwardly to the said flat face 6 of the head 4. After the head 4 is received in the socket the ends thereof are flared inwardly to hold the head from outward movement therefrom. Passing through suitable round bearing openings in the opposite sides of the socket 3 there is a bearing member. In the preferred embodiment of the improvement, the bearing member is in the nature of a bolt 7. The bolt has both of its ends headed, one of the said heads being formed on the bolt after the same is received in the socket. From the ends of the portions received in the bearings 8, the under face of the bolt is cutaway centrally providing the same with a flat face 9 that may bear directly upon the flat face 6 of the head 4. However, as it is desirous to reduce friction between the head and socket the flat face of the said bolt is provided with pockets forming raceways for anti-frictional balls 10 in Figure 1 of the drawings, while in Figure 3 the pockets are elongated to provide for the reception of anti-frictional rollers 11.

The shoulder 12 on the inner end of the rod 5, at its connection with the head, is so spaced that the said rod 5 is permitted to swing to angles of 45 degrees in the socket, as illustrated by the dotted lines in Figure 1 of the drawings. The bearing member 7 also revolves in its bearings when the shaft is thus swung. The rod 5 may assume these angles of inclination either horizontally or vertically as will be apparent.

The construction is extremely simple so that the joint may be cheaply manufactured and marketed.

In Figures 5, 6 and 7, the socket member 13 has its sides punched inwardly to provide bearing lugs 14. The outer faces of the lugs are rounded, but the sides thereof are converged inwardly, as indicated by the numeral 15. These angle walls are connected by a reduced rounded wall 16, (see Figure 7). By this construction it will be noted that when the rounded wall 16 is brought into contact with the flat face 17 with the semi-spherical head 18 received in the said socket 13 and its rounded surface brought into contact with the concaved bore of the socket 13 that only a minimum friction is exerted between the bearings 14 and the head 18. By inclining the sides 15 of the bearings 14, it will be noted that the head 18 may be swung to angles of 45 degrees in either direction.

In Figures 8 and 9 of the drawings, the socket member 19 is substantially similar to the socket disclosed in Figures 1, 2 and 3 of the drawings, as is the head 20 for the drive shaft 21. The outer face of the substantially rounded head 20, however, is cutaway or is formed with a flat surface 22. There is passed centrally through the head 20 a pin 23 that carries a disc head 24. The disc head is provided with circumferentially arranged radially disposed equidistantly spaced sockets for anti-frictional elements 25 which rest directly on the flat upper face of the head 20. The disc is provided with oppositely disposed trunnions 26 which are received in bearing openings in the opposite sides of the socket 19. The disc, of course, provides a fulcrum element for the head 20, as is true with respect to the elements 14 and 7. Of course, other fulcrum members for the substantially semi-spherical head may be employed, provided the same fall within the scope of the appended claim.

The simplicity of my improved construction and the advantages thereof will be perfectly apparent to those skilled in the art to which such inventions relate.

Having described the invention, I claim:—

A universal joint connection between a drive and driven shaft, comprising a semi-spherical head on one of said shafts, a socket on the end of the second shaft, receiving the head therein, an element revolubly seated at diametrically opposite points in the socket, and having a central reduced portion disposed over the flat face of the head, and anti-frictional elements carried by the reduced portion of said element bearing directly on the flat surface of the head.

In testimony whereof I affix my signature.

DABNEY P. OWENS.